United States Patent [19]

Schisselbauer

[11] Patent Number: 4,968,567
[45] Date of Patent: Nov. 6, 1990

[54] RESERVE ACTIVATED ELECTROCHEMICAL CELL WITH A CELL CONDITION CHECKING APPARATUS

[75] Inventor: Paul F. Schisselbauer, Southampton, Pa.

[73] Assignee: Honeywell Inc., Minneapolis, Minn.

[21] Appl. No.: 386,653

[22] Filed: Jul. 31, 1989

[51] Int. Cl.$^5$ .............................................. H01M 6/36
[52] U.S. Cl. ....................................... 429/90; 429/116
[58] Field of Search ................... 429/90, 116, 113, 110

[56] References Cited

U.S. PATENT DOCUMENTS

| | | | |
|---|---|---|---|
| 3,514,338 | 5/1970 | Eekma | 429/90 |
| 3,563,806 | 2/1971 | Hruden | 429/116 |
| 3,656,340 | 4/1972 | Ball | 429/90 |
| 4,695,520 | 9/1987 | Koper et al. | 429/116 |
| 4,861,686 | 8/1989 | Snyder | 429/116 |

*Primary Examiner*—Donald L. Walton
*Attorney, Agent, or Firm*—Roger W. Jensen; Mitchell J. Halista

[57] ABSTRACT

A reserve activated electrochemical cell with a cell condition checking apparatus uses a sealed electrolyte storage reservoir having an expandable pressurized capsule within the reservoir for pressurizing the electrolyte. The reservoir is provided with a rupturable diaphragm providing a fluid-tight seal across an opening in a wall of the electrolyte reservoir. The reservoir is formed integrally with a container for a reserve cell electrode assembly or stack with the wall therebetween containing the rupturable diaphragm. A selectively operable lance is arranged with a pointed first end adjacent to the diaphragm and a second or opposite end projecting out of the cell stack container. A resilient bellows is attached externally of the cell stack container to cover the projecting end of the lance while providing a fluid-tight seal to the external wall of the cell stack container. The bellows provides a deformable cap covering the projecting end of the lance to enable the lance to be selectively operated by an operator to penetrate the diaphragm to activate the cell by enabling the electrolyte to reach the cell stack. A pressure transducer is arranged within the cell stack container to contact the rupturable diaphragm adjacent to the lance to provide an output signal indicative of the pressure imposed on the electrolyte by the pressurized capsule. A pair of output leads from the pressure transmitter are arranged to extend through respective fluid-tight seals in a wall of the cell stack container to enable a cell condition check to be made based on the pressure within the electrolyte.

12 Claims, 1 Drawing Sheet

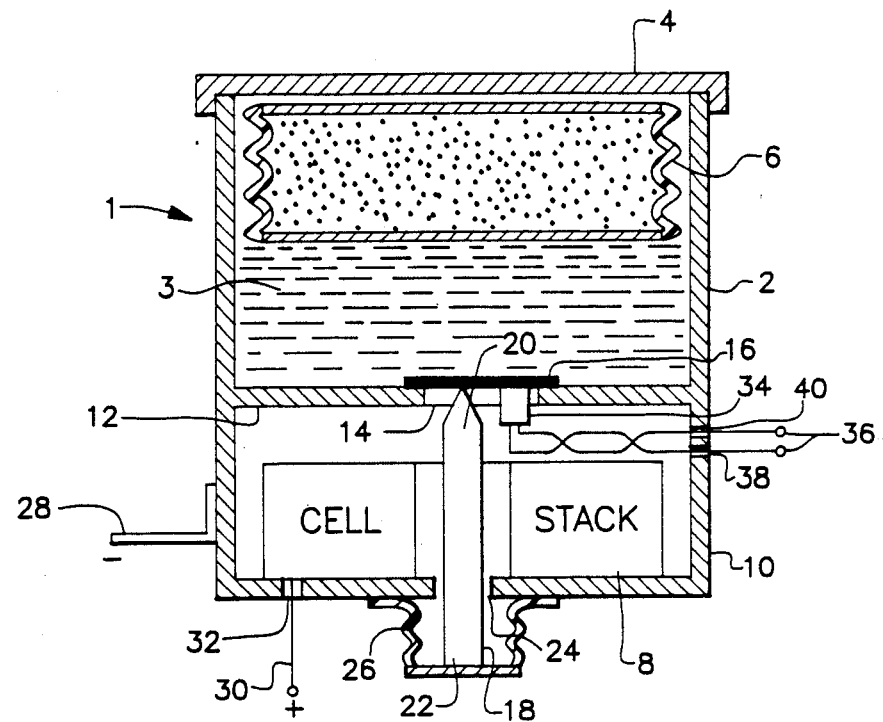

RESERVE ACTIVATED ELECTROCHEMICAL CELL WITH A CELL CONDITION CHECKING APPARATUS

The government has rights in this invention pursuant to Contract No. N60921-85-C-A244 awarded by the Department of the Navy.

BACKGROUND OF THE INVENTION

1. Field of the Invention

The present invention relates to reserve activated electrochemical cells. More specifically, the present invention is directed to an improved reserve activated electrochemical cell containing an electrolyte reservoir for selectively releasing a stored electrolyte to activate the electrochemical cell.

SUMMARY OF THE INVENTION

An object of the present invention is to provide an improved reserve activated electrochemical cell having an apparatus for checking the condition of an inactive or dormant reserve cell.

In accomplishing this and other objects, there has been provided, in accordance with the present invention, a reserve activated electrochemical cell including a pressurized electrolyte reservoir, a cell stack assembly container, a rupturable diaphragm means separating the reservoir from the container, a selectively actuable diaphragm piercing means for releasing the electrolyte into the cell container and a pressure transducer means for monitoring the pressure of the electrolyte.

BRIEF DESCRIPTION OF THE DRAWING

A better understanding of the present invention may be had when the following detailed description is read in connection with the accompanying drawing, in which the single figure is a cross-sectional illustration of an example of a reserve activated electrochemical cell embodying the present invention in an inactive electrolyte storing state.

DESCRIPTION OF THE PREFERRED EMBODIMENT

Referring to the single figure drawing in more detail, there is shown an electrochemical cell 1 in an inactive or electrolyte storing state including an electrolyte reservoir 2 containing an electrolyte 3. The electrolyte reservoir 2 is closed at one end by a cap 4 forming a fluid-tight seal therewith. An expandable pressurized capsule 6 is located within the reservoir 2 to apply a pressure to the electrolyte 3. The capsule 6 contains a pressurized gas and is arranged with flexible sidewall to allow the capsule to expand to force the electrolyte from the reservoir 2 upon an activation of the cell 1, as discussed more specifically hereinafter. A cell stack or assembly 8 comprising a plurality of pairs of opposite polarity electrochemical plates, e.g., battery anodes and cathodes, is located within a cell stack container 10. The cell stack container 10 may advantageously be formed as an extension of the electrolyte reservoir 2. An internal wall 12 is arranged to separate the cell stack container 10 from the electrolyte reservoir 2. The wall 12 is provided with a hole 14 extending therethrough to define an electrolyte conduit between the reservoir 2 and the cell stack container 10.

The hole 14 is covered by a rupturable diaphragm 16 which is peripherally attached to the wall 12 to form a fluid-tight seal across the hole 14. A selectively actuable lance 18 is positioned with a pointed first end 20 located adjacent to the diaphragm 16. The other or second end 22 of the lance 18 is arranged to project through a hole 24 in a wall of the cell stack container 10 to a location external of the cell stack container 10. The second end 22 is covered by a flexible bellows 26 having a fluid-tight seal with an external surface of the cell stack container 10 to form a leakage barrier for the electrolyte flowing from the cell stack container 10 through the hole 24. The bellows 26, thus, provides a deformable cap means for use by an operator to selectively propel the lance 18 into the diaphragm 16 to rupture the diaphragm 16 and to enable the electrolyte 3 to enter the cell stack container 10 through the hole 14 to energize the reserve cell. While a manual activation of the lance 18 is shown in the illustration of the present invention, other types of activating means, e.g., an explosive device, may be used to propel the lance 18.

A first cell electrode 28 is attached to the wall of the cell stack housing 10 to provide a first polarity electrical connection to the first polarity electrodes within the cell stack 8. A second electrical connection 30 is arranged to extend through the wall of the cell stack 10 through a fluid-tight seal 32 to provide an electrical connection to the second polarity electrodes in the cell. stack 8. A pressure transducer or transmitter 34 is attached to the diaphragm 16 to provide an output signal indicative of the pressure within the electrolyte 3. Electrical connections to the pressure transmitter 34 are provided by a pair of electrical leads 36 extending through respective fluid-tight seals 38,40 in the wall of the cell stack container 10 to the pressure transmitter 34. The pressure transmitter 34 may be any suitable pressure measuring element such as those piezoresistive transducers shown in U.S. Pat. Nos. 4,592,229; 4,685,469 and 4,726,233, such devices being well-known in the art.

The reserve cell illustrated in the drawing is maintained in a dormant state by storing the electrolyte 3 in a separate reservoir isolated from the cell stack 8. The electrolyte reservoir 2 is pressurized by the expandable capsule 6 containing a suitable pressurized gas, e.g., argon. This pressurized reservoir 2 is effective to contain the pressurized electrolyte 3 in the dormant state while allowing the electrolyte 3 to be delivered to the cell stack 8 when required to activate the reserve cell. Since the motivating gas within the capsule 6 is separated from the electrolyte 3, its pressurizing behavior is predictable by use of the conventional gas laws whereby the system can be tailored to meet specification requirements for the reserve cell.

In conventional reserve cells, the condition of the reserve cells' reservoir system has been determined during the battery's assembly by monitoring the gas charge introduced within the capsule 6. After assembly of this gas capsule 6 within the reserve battery structure, the prior art provides no means for testing the reserve cell to determine if the cell would function properly upon an activation of the reserve cell. Such malfunction could result from transportation shock and vibration which would produce a leakage of the gas charge within the capsule 6. Advantageously, such a check of the status of the reserve cell should be made during a non-operating condition of the cell, i.e., prior to activation. The present invention is based on the difference in molecular size between the electrolyte and the motivating gas within the capsule 6. Since the motivating gas molecule is much smaller than the electrolyte molecule, the smaller motivating gas will fit within the interstice of the electrolyte molecule. Because of this phenomenon, if the medium that separates the motivating gas from the electrolyte has a leakage path, the high pressure motivating gas from the capsule 6 would migrate interstitially into the electrolyte. This migration would result in a pressure drop of the overall electrolyte reservoir 2 including the electrolyte 3 and the pressurizing capsule 6.

The apparatus of the present invention includes a pressure transducer or transmitter 34 which is located on the other side of the bulkhead separating the electrolyte 3 from the cell stack assembly 8. Specifically, the pressure transducer 34 is located in contact with the rupturable diaphragm 16 and adjacent to the piercing lance 18. The electrical connections for the pressure transducer 34 are extended out of the cell stack container 10 through respective fluid-tight seals to provide electrical connections 36 for attaching an electrical measuring apparatus (not shown) to monitor the output of the pressure transducer 34. This configuration permits a check of the condition of the electrolyte reservoir 2 during a non-operating condition of the reserve cell. The materials for the diaphragm 16 and the transducer 34 would be selected to be compatible with the electrolyte 3 to avoid corrosion problems, e.g., stainless steel. The monitoring of the pressure in the electrolyte 3 could be programmed as a microprocessor function and used by a microprocessor connected to the connections 36 in combination with concurrent thermal monitoring to take into account thermal effects on the system pressure. In this arrangement, the monitoring of the electrolyte reservoir system pressure would avoid the problem of activating a defective reserve cell which has lost sufficient pressure to prevent a full delivery of electrolyte 3 into the cell stack 8.

Accordingly, there has been provided, in accordance with the present invention, an improved reserve activated electrochemical cell structure having a cell condition checking apparatus.

The embodiments of the present invention in which an exclusive property or privilege is claimed are defined as follows:

1. An electrochemical cell comprising
a pressurized electrochemical reservoir means for storing an electrochemical fluid and
a pressure transducer means for monitoring the pressure of the fluid within said electrochemical reservoir.

2. A cell as set forth in claim 1 wherein said reservoir means includes an expandable pressurized capsule within said reservoir means and an internal volume external to said capsule for accommodating the electrochemical fluid.

3. A cell as set forth in claim 2 wherein the fluid is an electrolyte.

4. A cell as set forth in claim 1 wherein said transducer means includes a piezoresistive pressure transducer attached to an external surface of said reservoir.

5. A cell as set forth in claim 1 wherein said reservoir means includes selectively operable means for releasing the fluid from said reservoir means.

6. A reserve activated electrochemical cell comprising
a pressurized electrochemical reservoir means for storing an electrochemical fluid,
an electrochemical stack container means for storing electrodes responsive to the fluid,
a selectively rupturable wall means for separating said reservoir means from said container means and
pressure transducer means for monitoring the pressure of the fluid in said reservoir means.

7. A cell as set forth in claim 6 wherein said reservoir means includes an expandable pressurized capsule within said reservoir means and an internal volume external to said capsule for accommodating the electrochemical fluid.

8. A cell as set forth in claims 7 wherein the fluid is an electrolyte and the electrodes are battery anodes and cathodes.

9. A cell as set forth in claim 6 wherein said transducer means includes a piezoresistive pressure transducer attached to an external surface of said reservoir.

10. A cell as set forth in claim 10 wherein said cell means includes a hole in said wall means and rupturable diaphragm arranged to provide a fluid-tight seal across said hole.

11. A cell as set forth in claim 10 wherein said wall means includes a selectively operable lance means for piercing said diaphragm to release the fluid from said reservoir means into said container means.

12. A cell as set forth in claim 11 wherein the fluid is an electrolyte and the electrodes are battery anodes and cathodes.

* * * * *

UNITED STATES PATENT AND TRADEMARK OFFICE
CERTIFICATE OF CORRECTION

PATENT NO. : 4,968,567
DATED : November 6, 1990
INVENTOR(S) : Paul F. Schisselbauer It is certified that error appears in the above-identified patent and that said Letters Patent is hereby corrected as shown below:

Column 4, line 38, cancel "10" and substitute --6--.

Signed and Sealed this

First Day of December, 1992

Attest:

DOUGLAS B. COMER

*Attesting Officer*   Acting Commissioner of Patents and Trademarks